Sept. 22, 1925.  W. T. McCARLEY  1,554,918
CLIP
Filed Jan. 31, 1925

W. T. McCarley,
INVENTOR

BY Victor J. Evans
ATTORNEY

P. E. Hickey.

WITNESS:

Patented Sept. 22, 1925.

1,554,918

UNITED STATES PATENT OFFICE.

WILLIAM T. McCARLEY, OF LULING, TEXAS.

CLIP.

Application filed January 31, 1925. Serial No. 6,039.

*To all whom it may concern:*

Be it known that I, WILLIAM T. McCARLEY, a citizen of the United States, residing at Luling, in the county of Caldwell and State of Texas, have invented new and useful Improvements in Clips, of which the following is a specification.

This invention relates to improvements in clips for use upon Ford automobiles and adapted to be attached to the front spring and cross member of the chassis and which owing to its width will extend over more space than the usual U-bolts now in use on the Ford in order to prevent the car from rocking and prevent the front fenders from riding the front wheels as well as to take the strain off of the front axle and cross member.

Another object of the invention is the provision of a clip bar which is received on the lower end portions of the bolt and having reduced and raised portions upon opposite sides of the clip bar in order to receive springs having seven and nine leaves respectively.

A further object of the invention is to provide a crank bearing upon the upper side thereof whereby the crank may be positioned therein and without changing the structural details of the Ford in any respect in order that the same may be readily and easily applied thereto.

With the above and other objects in view, the invention further includes the following novel features and details of construction, to be hereinafter more fully described, illustrated in the accompanying drawing and pointed out in the appended claims.

In the drawing:—

Figure 1:
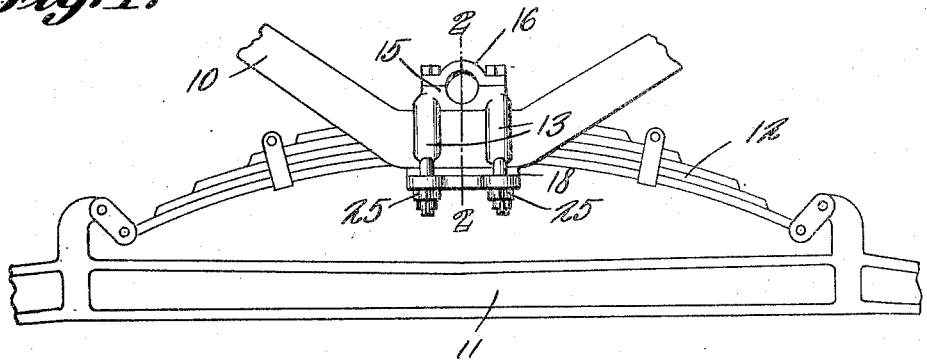
Figure 1 is a front elevation of a portion of a Ford automobile showing the present invention applied thereto.

Referring to the drawing in detail, wherein like characters of reference denote corresponding parts, the reference character 10 indicates the front cross member of a Ford automobile, 11 the axle and 12 the leaf spring, all of which are of the usual and well known construction and form no part of the present application for Letters Patent but are merely shown for purposes of illustration in bringing forward the purposes and advantages of the above entitled invention.

In the present invention, I provide pairs of U-bolts 13 and 14 respectively formed integrally with and extend downwardly from an upper portion 15 which includes thereon a bearing member 16 which is adapted to receive a portion of a crank, not shown, of the automobile therein. These pairs of U-bolts 13 and 14 have their upper inner sides flattened as at 17 and which are adapted to lie flush with the outer side walls of the channel-shaped cross member 10 into which the spring is positioned and in order that the same, that is the springs, will be held against rocking or lateral movement therein.

It is to be noted that the channel-shaped cross member 10 may receive either seven leaf or nine leaf springs and in order to provide means for accommodating these various springs having a multiplicity of leaves, I provide a clip plate 18 which includes an opening 19 centrally thereof and which is adapted to receive the lower end portion of a tie bolt 20 which extends centrally through the leaves of the springs. This plate 18 includes pairs of apertured lug members 21 and 22 which are adapted to receive the lower end portions of the U-bolts 13 and 14 respectively.

Figure 2:
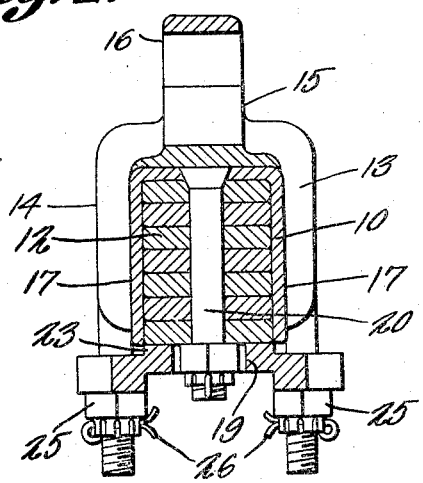
Figure 2 is a longitudinal section taken on line 2—2 of Figure 1 and shown as applied to a seven leaf spring.
Figure 3:
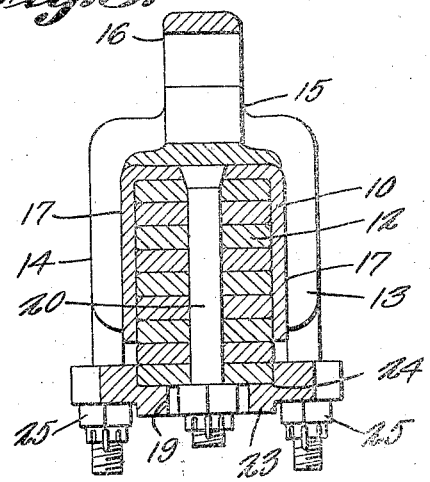
Figure 3 is a similar view showing the clip plate reversed and accommodating a nine leaf spring.
Figure 4:
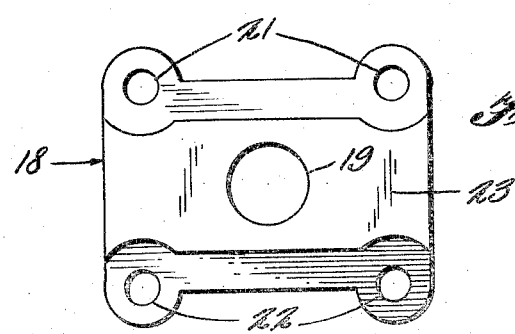
Figure 4 is a plan view of the clip bar showing the raised portion thereon.

As clearly illustrated in Figure 2 of the drawing, wherein a seven leaf spring is positioned and in which view the clip plate 18 is shown as having a raised portion 23 which lies flush with the lower or main leaf of the seven leaf spring; and in Figure 3 of the drawing there is shown the same identical clip used and accommodating a nine leaf spring when the said clip plate 18 is reversed and the lower spring leaf is received within a depressed portion 24 in the opposite face of the clip plate 18.

In order to move the plate 23 vertically with respect to the bolts 13 and 14 a pair of castellated nuts 25 are received on the lower end portions of the bolts and held against accidental displacement thereon through the instrumentality of the usual and ordinary type of cotter pins 26, It will thus be noted that this clip may be used either on touring cars or trucks and accommodate either seven or nine leaf springs without departing or changing the structure of the clip in any way, shape, manner or form and yet be used on any make of Ford car.

It is also to be noted that this upper portion 15 of the clip extends over a greater distance than does the usual single U-bolt now in use on the Ford cars and having the wide plates upon the lower end portion thereof which will engage and lie flush with the lower face of the bottom leaf in order to prevent the spring leaves from buckling and preventing the cross member 10 from breaking as well as provide a bearing 16 for the crank of the automobile.

The invention is susceptible of various changes in its form, proportions and minor details of construction, and the right is herein reserved to make such changes as properly fall within the scope of the appended claims.

Having thus described my invention what is claimed is:

1. A clip for use upon automobile cross members and leaf springs comprising a bearing member, a pair of U-bolts formed integral with and extending downwardly from said bearing member and receiving the cross member therebetween, a plate member received upon the lower end portions of the U-bolts, said plate member having channeled and raised portions respectively upon opposite sides thereof, and means included upon the lower end portions of the U-bolts whereby the said plate will be held in adjusted position with respect to the cross member and leaf spring.

2. A clip for use upon automobiles comprising a bearing member upon the upper portion thereof, a pair of U-bolts formed integrally with and extending downwardly therefrom and receiving a channeled cross member therebetween, a leaf spring received within the channeled cross member, a plate member having a plurality of openings therein and adapted to be received on the lower end portions of the U-bolts and receive the lower end portions of the leaf spring tie bolt therein, said plate member having channeled and raised portions respectively upon opposite sides thereof, and adjusting nuts included upon the lower end portions of the U-bolts whereby the said plate member may be adjusted in order to receive leaf springs having varying numbers of leaves.

In testimony whereof I affix my signature.

WILLIAM T. McCARLEY.